United States Patent [19]

Markbreiter et al.

[11] Patent Number: 4,942,734
[45] Date of Patent: Jul. 24, 1990

[54] COGENERATION OF ELECTRICITY AND LIQUID CARBON DIOXIDE BY COMBUSTION OF METHANE-RICH GAS

[75] Inventors: Stephen J. Markbreiter, Edison; Daniel J. Dessanti, Teaneck, both of N.J.; Hans P. Schorr, Douglaston, N.Y.

[73] Assignees: Kryos Energy Inc., New York; The Brooklyn Union Gas Company, Brooklyn, both of N.Y.

[21] Appl. No.: 326,636

[22] Filed: Mar. 20, 1989

[51] Int. Cl.⁵ .......................... F02C 6/18; F25B 27/02
[52] U.S. Cl. .................... 60/39.02; 60/39.07; 60/39.182; 62/238.3
[58] Field of Search .............. 60/39.02, 39.07, 39.182, 60/728, 39.33; 62/238.3, 323.1, 323.2

[56] References Cited

U.S. PATENT DOCUMENTS

| | | | |
|---|---|---|---|
| 2,339,185 | 1/1944 | Nettel | 60/728 |
| 4,528,811 | 7/1985 | Stahl | 60/39.07 |
| 4,711,093 | 12/1987 | Markbreiter et al. | 62/20 |
| 4,745,768 | 5/1988 | Schorr et al. | 62/238.3 |

*Primary Examiner*—Louis J. Casaregola
*Attorney, Agent, or Firm*—Paul W. Garbo

[57] ABSTRACT

Cogeneration of electricity and liquid carbon dioxide is conducted by combusting methane-rich gas to power a gas turbine and a steam turbine; each turbine drives an electric generator. Carbon dioxide is separated from the combustion products by an amine absorption system to which heat for releasing absorbed carbon dioxide is supplied by steam drawn from the steam turbine. Some of that steam is used to produce refrigeration with an ammonia absorption refrigeration unit. The refrigeration is applied to the separated carbon dioxide to liquefy it. Fractionation to yield purified liquid carbon dioxide is easily achieved and saleable refrigeration is another optional product of cogeneration.

18 Claims, 2 Drawing Sheets

FIG. 1

COGENERATION OF ELECTRICITY AND LIQUID CARBON DIOXIDE BY COMBUSTION OF METHANE-RICH GAS

BACKGROUND OF THE INVENTION

This invention relates to the cogeneration of electricity and liquid carbon dioxide ($CO_2$) by the combustion of natural gas or like fuel gas rich in methane. More particularly, the invention achieves such cogeneration with a simple integrated system and with high efficiency relative to the thermal energy of the fuel gas consumed.

In recent years, the cogeneration of electricity and saleable refrigeration or steam has received intensified investigation. Many processes have been proposed and some have been commercially adopted. For example, U.S. Pat. No. 4,711,093 to Markbreiter and Dessanti discloses and claims a recent development in which pipeline gas is work-expanded to produce electricity and refrigeration. Other cogeneration systems have been built and are producing electricity and steam by burning methane-rich gas in a turbine.

However, it is not always practical at any given location where electricity is needed to find customers who are available to purchase steam or refrigeration.

The sales expansion or carbonated drinks such as beer and various sodas and frozen foods has led to a worrisome, tight supply of food-grade $CO_2$. It is common practice that food-grade $CO_2$ is transported as a liquid from the supplier to the plants producing carbonated beverages or frozen foods by tank truck. The dual circumstances that liquid $CO_2$ is in short supply and is readily transported from its source to its consumption have, together with the need for a cogeneration process that yields electricity and a product other than refrigeration or steam, sparked the conception of this invention.

Accordingly, a principal object of the invention is to cogenerate electricity and liquid $CO_2$ by the combustion of natural gas or like fuel gas.

Another important object is to provide a simple, integrated cogeneration system in which all of the power required by the system is derived from the combustion of the fuel gas.

A further noteworthy object is to operate the cogeneration system with high efficiency relative to the thermal energy of the fuel gas which is burned.

These and other objects and advantages of the invention will be evident from the description which follows.

SUMMARY OF THE INVENTION

In accordance with this invention, the efficient cogeneration of electricity and liquid $CO_2$ by the combustion of methane-rich gas is conducted in a system comprising four basic components: a gas-burning turbine combined with a steam turbine in which each turbine is coupled to an electric generator; an amine absorption system to separate $CO_2$ from the flue gas resulting from the operation of the two turbines; and ammonia absorption refrigeration unit to recover waste heat from the flue gas; and $CO_2$ liquefaction apparatus receiving refrigeration from the ammonia absorption unit. The four components have individually been fully developed and are widely used in industry. General Electric and Westinghouse are prominent suppliers of gas and steam turbines. The amine absorption system, the ammonia absorption refrigeration unit and $CO_2$ liquefaction equipment are likewise individually used in various segments of the chemical and related process industries. The present invention lies in the unique integration of the four components for the efficient cogeneration of electricity and liquid $CO_2$, two dissimilar end products previously not considered in planning cogeneration plants.

The feed gas for the process of the invention is natural gas or other methane-rich gas such as syngas or refinery gas that has a low content of undesirable gases such as hydrogen sulfide. As known, natural gas often contains varying amounts of ethane, propane and higher hydrocarbons. Inasmuch as natural gas is conveyed by pipeline at elevated pressure to various parts of the country, the use of pressurized pipeline gas is particularly advantageous to the cogeneration process of this invention wherein the first step is the combustion of a pressurized fuel gas in a gas turbine.

A noteworthy feature of the cogeneration system is that it permits the addition of equipment to increase the purity of the liquid $CO_2$ product and/or overall energy efficiency of the system. The decision of whether or not to add such equipment will vary from locale to locale and depend on weighing capital cost against operating cost.

As previously mentioned, all of the components of the novel cogeneration system are well known and therefore need no detailed description herein. The connections of the four basic components forming the integrated cogeneration system are more easily explained by reference to a flow diagram.

BRIEF DESCRIPTION OF THE DRAWINGS

For a fuller understanding of the invention, the ensuing description will refer to the appended drawings of which:

FIG. 1 is a flow diagram of the basic cogeneration system of this invention;

DESCRIPTION OF PREFERRED EMBODIMENTS

Figure 1:
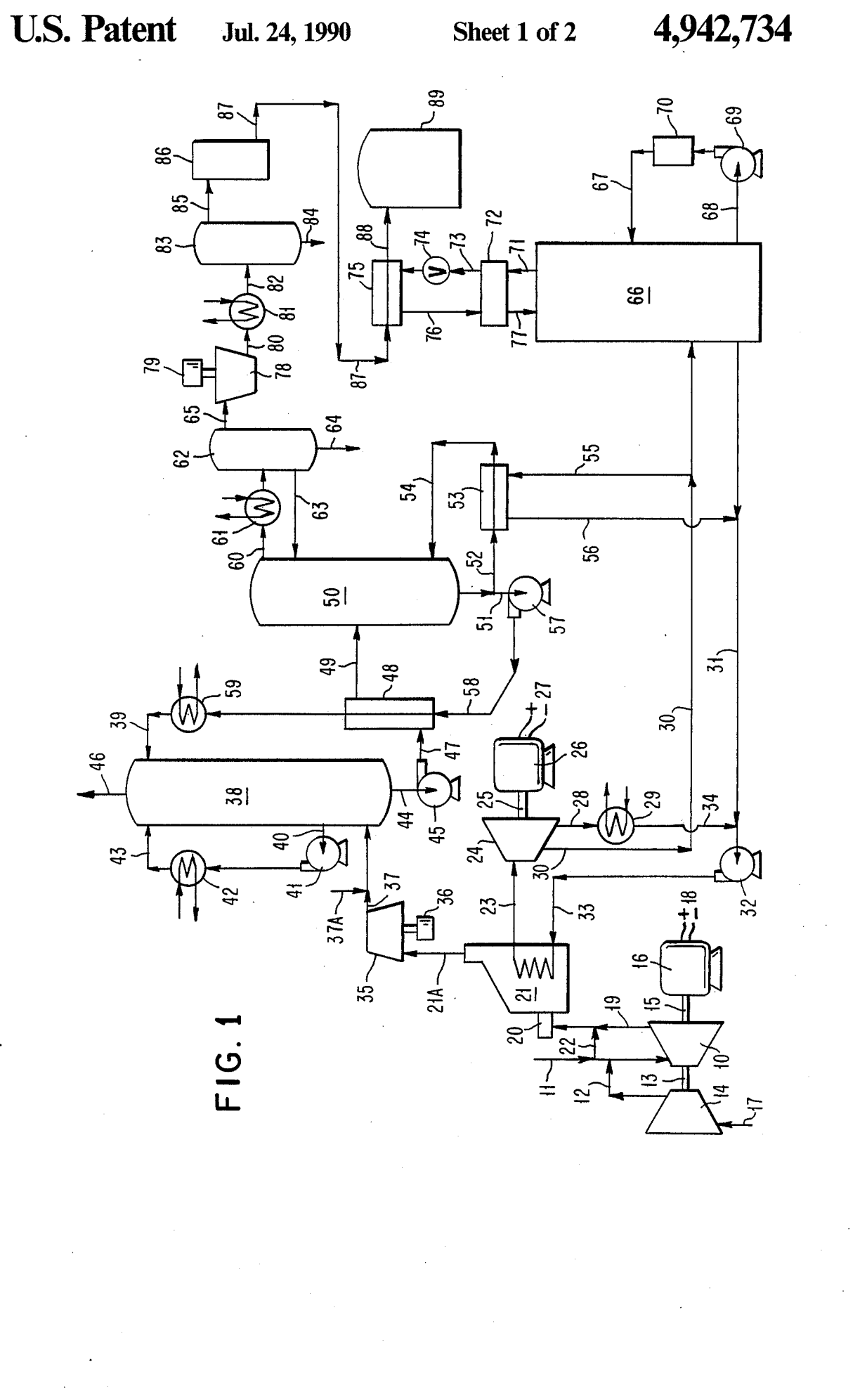
Figure 2:
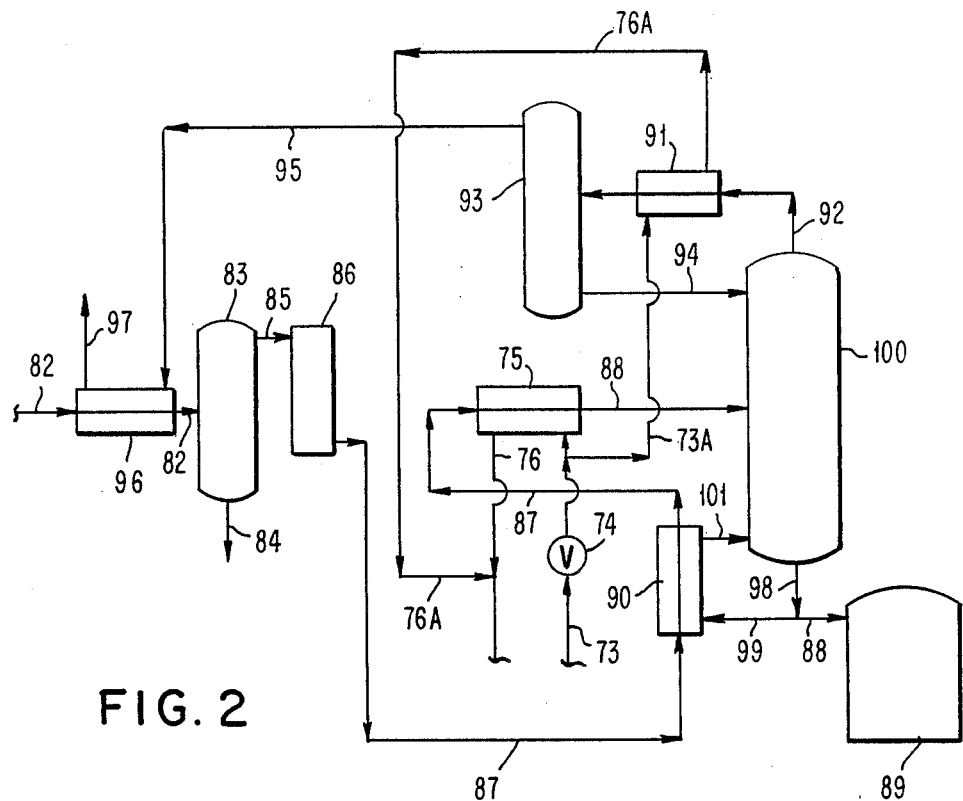
FIG. 2 is a partial flow diagram showing a preferred modification of the system of FIG. 1 involving the integration of a fractionation column to increase the purity of the liquid $CO_2$ product.

The decription of FIG. 1 will include data of a specific example of the invention.

Pipeline natural gas with a low (net) heating value of 930 British Thermal Units (BTU) per standard cubic foot enters the combustor of gas turbine 10 via line 11 with about three times the required amount of combustion air from line 12. For the chosen gas turbine 10, the natural gas is fed at a pressure of 400 pounds per square inch absolute (psia) and a temperature of 60° F. and at the rate of 226,000 standard cubic feet per hour (SCFH). Other available gas turbines usually operate in the pressure range of 200 to 450 psia. The power generated by turbine 10 is transferred in part through shaft coupling 13 to centrifugal compressor 14 and in part through shaft coupling 15 to electric generator 16. Compressor 14 raises the pressure of ambient air entering at intake 17 to 400 psia so that it can via line 12 join the natural gas in line 11. Generator 16 yields 21.5 megawatts (MW) of electricity at terminals 18.

The hot exhaust gases containing excess oxygen leave turbine 10 at a temperature of 965° F. and flow through line 19 to burner 20 of steam boiler 21. Natural gas flows from line 11 through line 22 which has a pressure-reducing valve (not shown) so that it joins the exhaust gases in line 19 at slightly above atmospheric pressure. The quantity of natural gas fed by line 22 is 427,500 SCFH which is computed to be just enough to consume all of the residual free oxygen in the exhaust gases flowing into burner 20. However, the combustion reaction does not go to absolute completion; fractional percentages by volume of both oxygen and methane remain in the combustion products. The combustion of this additional natural gas is utilized to produce steam at a pressure of 600 psia and temperature of 750° F. in boiler 21. The high-pressure steam flows via line 23 to steam turbine 24 which is coupled through shaft 25 to electric generator 26. The electric output of generator 26 at terminals 27 is 34.3 MW. The final combustion products or flue gas leaves boiler 21 through line 21A at a temperature of 350° F.

Fully expanded steam exiting turbine 24 passes through line 28 to water-cooled condenser 29. The pressure at the exit port of steam turbine 24 is 2.5 inches of mercury column. Some (about 45%) of the high-pressure steam supplied to turbine 24 is withdrawn at an intermediate stage of expansion and flows at a pressure of 70 psia and temperature of 320° F. through line 30 to provide process heat as will be explained later. The condensate from the heating steam in line 30 returns via line 31, pump 32 and line 33 to boiler 21. The condensate formed in condenser 29 flows through line 34 into line 31 for return with the other condensate to boiler 21.

Thus far, the first component of the cogeneration system, namely, the combined gas turbine and steam turbine, each driving an electric generator, has been described and shown to produce a total of 55.8 MW of electricity. Boiler 21 produces high-pressure steam at a rate of 427,500 pounds per hour.

Turning to a second component of the cogeneration system, blower 35 driven by electric motor 36 raises the pressure of the flue gas at nearly atmospheric pressure in line 21A sufficiently to enter via line 37 amine absorption column 38 and to flow up therethrough. Inasmuch as the flue gas is at a temperature of 350° F., water is injected by line 37A into line 37 to drop the temperature of the flue gas to a level of about 100° F. before it enters column 38. Regenerated amine solution enters column 38 via line 39 and flows downwardly countercurrent to the rising flue gas to absorb $CO_2$ therefrom. The heat of absorption is dissipated by circulating the amine solution in column 38 through 40, pump 41, water-cooled exchanger 42 and line 43. The $CO_2$-laden solution discharges from column 38 via line 44 into pump 45. The discard gas, roughly 89% by volume of nitrogen and 10% by volume of water vapor, leaves column 38 through line 46. The discard gas contains about 0.5% by volume of each of oxygen and $CO_2$.

Pump 45 passes the $CO_2$-enriched amine solution through line 47, heat exchanger 48 and line 49 to stripping column 50. Stripping heat is supplied to column 50 by circulating amine solution through lines 51, 52, reboiler 53 and lines 54. Steam drawn from line 30 flows through line 55 to provide heat in reboiler 53. Condensate leaves reboiler 53 via line 56 and discharges into line 31.

Stripped amine solution from line 51 is returned by pump 57 through line 58, heat exchanger 48, water-cooled exchanger 59 and line 39 to absorption column 38. Part of the heat in the stripped amine solution is transferred in exchanger 48 to the $CO_2$-laden solution fed to stripping column 50.

The $CO_2$ gas released from the amine solution rises to the top of column 50 and together with water vapor passes via line 60 through water-cooled condenser 61 to discharge into separator 62. Water condensate returns from separator 62 via line 63 as reflux in column 50. Water is discarded from separator 62 via drain line 64 to eliminate the water entering the cogeneration system such as at line 37A and that formed by the combustion of natural gas. $CO_2$ gas exist separator 62 through line 65. The $CO_2$ gas issues at slightly above atmospheric pressure and at a temperature of about 100° F.; hence, it is saturated with water vapor but it contains only a very small fractional percentage (approximately 0.1%) by volume of other gases such as nitrogen, carbon monoxide, methane and oxygen. This complete the description of the second component of the cogeneration system wherein $CO_2$ gas is separated from the flue gas produced by gas turbine 10 and burner 20 of steam boiler 21.

To liquefy the $CO_2$ gas in line 65, refrigeration is provided by ammonia absorption refrigeration unit 66. As known, ammonia absorption unit 66 requires heat for its operation and in accordance with this invention the heat is supplied by steam at a pressure of 70 psia drawn from steam turbine 24 by line 30. The condensate from the steam utilized in unit 66 is returned to boiler 21 by line 31, pump 32 and line 33. Also as known, absorption unit 66 requires cooling water to condense the ammonia vapor generated therein. For this purpose, cold water flows from line 67 to unit 66; warm water issues from unit 66 through line 68 and is forced by pump 69 through cooling tower 70 and line 67 back to ammonia absorption unit 66.

Liquid ammonia flows from unit 66 through line 71, heat exchanger 72, line 73 and pressure-reducing valve 74 into heat exchanger 75 wherein the ammonia is vaporized to provide refrigeration to exchanger 75 as well as to exchanger 72 by the passage of cold ammonia vapor from exchanger 75 through line 76, exchanger 72 and line 77 back to ammonia absorption unit 66. The evaporating liquid ammonia in exchanger 75 causes the liquefaction of compressed $CO_2$ gas as will be explained herebelow. Hence, exchanger 75 is the $CO_2$ condenser of the remaining fourth component of the cogeneration system. Also, inasmuch as cold ammonia vapor provides refrigeration to the liquid ammonia passing through exchanger 72, exchanger 72 is the subcooler of liquid ammonia that is usually part of the ammonia absorption refrigeration unit supplied by manufacturers such as Linde AG of West Germany. The operation of ammonia absorption refrigeration unit 66 as an integral component of the novel cogeneration system has now been completed.

There remains only the $CO_2$ liquefaction component requiring description. The $CO_2$ vapor in line 65 is compressed in centrifugal compressor 78 driven by electric motor 79. The compressed $CO_2$ at a pressure of 260 psia flows line 80 through water-cooled exchanger 81 wherein the $CO_2$ gas is cooled to a temperature of about 100° F. with the result that moisture in the gas is condensed. The cooled stream passes via line 82 to separator 83 wherein water condensate is knocked down and discharged through drain line 84. $CO_2$ vapor saturated with moisture passes via line 85 to dryer 86 wherein residual moisture in the compressed $CO_2$ gas is removed therefrom. Any of various known dryers may be used as dryer 86. Desirably, dryer 86 may be filled with a molecular sieve that adsorbs moisture. Dry $CO_2$ gas flows through line 87 and condenser 75, and discharges via line 88 as liquid $CO_2$ into storage tank 89. The liquid $CO_2$ in tank 89 is at pressure of 255 psia and temperature of $-10°$ F. Liquid $CO_2$ is recovered at the rate of 77,300 pounds per hour. The description of the $CO_2$ liquefaction component has just been completed and thus the description of the fully integrated cogeneration system has also been completed.

Some additional data of the foregoing example of the invention deserve mention. The electric power consumed by motors in the cogeneration system is as follows:

| | |
|---|---|
| Flue gas blower 35 | 0.82 MW |
| Amine solution pumps 45, 57 | 0.33 MW |
| $CO_2$ compressor 78 | 2.67 MW |
| Cooling water pumps for 29, 42, 59, 61, 69, 81 | 1.10 MW |
| Fans of cooling tower 70 | 0.65 MW |
| All other power requirements of system | 0.66 MW |
| Total power consumption | 6.23 MW |

Accordingly, after satisfying all the electric power requirements of the entire cogeneration system, 49.5 MW are the net electrical output of the system. On an hourly basis, of the 427,500 pounds of steam generated by boiler 21, 170,00 pounds are utilized by reboiler 53, 40,000 pounds are used in ammonia absorption unit 66, and 10,000 pounds are consumed for miscellaneous needs. The remaining 207,500 pounds per hour of steam are completely expanded in turbine 24 and condensed in water-cooled exchanger 29.

FIG. 2 shows the addition of a fractionation column in the $CO_2$ liquefaction component of the cogeneration system of FIG. 1. The fractionation column is used to raise the purity of the liquid $CO_2$ product to meet the standards for $CO_2$ utilized by the food and beverage industries. In this case, dry compressed $CO_2$ gas leaving dryer 86 via line 87 first passes through reboiler 90 of fractionator 100 and then through condenser 75 before discharging via line 88 into fractionator 100. As in FIG. 1, subcooled liquid ammonia from unit 66 flows through line 73 and pressure-reducing valve 74 to supply the refrigeration required in condenser 75 to liquefy $CO_2$. Part of the subcooled liquid ammonia in line 73 is passed by line 73A to reflux condenser 91 of fractionator 100. Ammonia vapor leaves condenser 91 via line 76A and joins ammonia vapor flowing from $CO_2$ condenser 75 through line 76 for return to absoption unit 66.

Vapor exiting from the top of fractionator 100 via line 92 passes through reflux condenser 91 and discharges into separator 93. All but a very small percentage on the order of 1 to 2% of the vapor passing through condenser 91 is liquified and returns from separator 93 to fractionator 100 via line 94. The uncondensed vapor which is $CO_2$ containing approximately 5% by volume of impurities such as nitrogen, carbon monoxide, oxygen and methane flows from separator 93 through line 95. Inasmuch as this discard gas stream is cold, it is preferred to pass it through heat exchanger 96 which is inserted in line 82. In this way, the temperature of the $CO_2$ gas is reduced so that more of the moisture in the gas is condensed and knocked down in separator 83. With less residual moisture in the $CO_2$ gas passing via line 85 into dryer 86, regeneration of the drying agent used therein will be less frequent. The discard gas containing the impurities is vented through line 97.

Purified liquid $CO_2$ flows from the bottom of fractionator 100 via lines 98 and 88 into storage tank 89. Liquid $CO_2$ from line 98 also circulates through line 99, reboiler 90 and line 101 back to fractionator 100. The purified liquid $CO_2$ reaching tank 89 has only about 25 parts per million of impurities and thus satisfies the specifications for food-grade $CO_2$.

Figure 3:
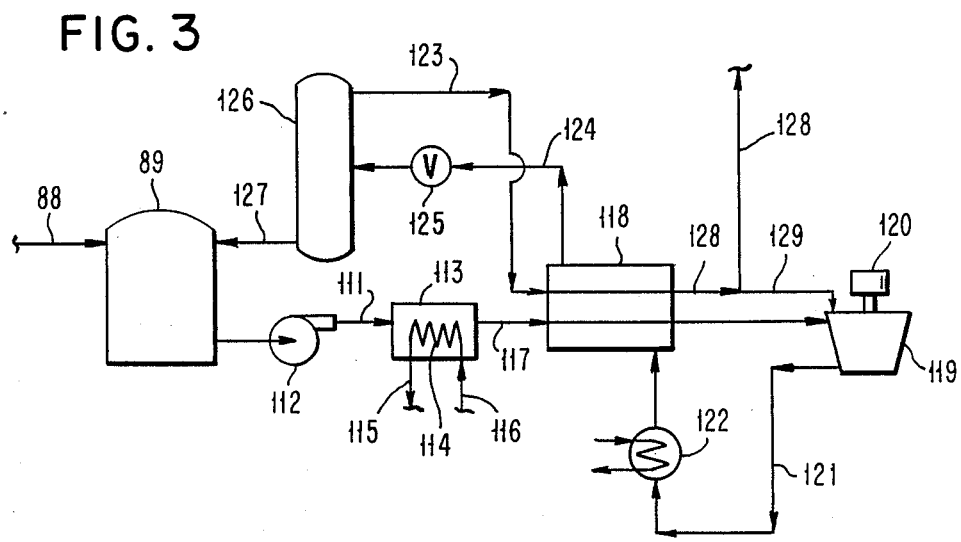
FIG. 3 is a partial flow diagram showing the addition of equipment to the basic system of FIG. 1 to permit the sale of refrigeration as a third product of the invention.

FIG. 3 shows how the liquid $CO_2$ stored in tank 89 of FIG. 1 or of FIG. 2 can be used to sell refrigeration to a customer such as a frozen food warehouse located off the premises of the cogeneration plant. In such case, liquid $CO_2$ is drawn from tank 89 by line 111 and pump 112 and discharged into evaporator 113 to refrigerate a brine or an antifreeze liquid passed through coil 114 in $CO_2$ evaporator 113. The chilled brine or other liquid leaves coil 114 via line 115 for delivery to a customer's plant (not shown) and returns warmed up via line 116 to be again chilled in coil 114. $CO_2$ gas leaving evaporator 113 via line 117 passes through heat exchanger 118 before entering compressor 119 driven by electric motor 120. Compressed $CO_2$ gas flows through line 121 and water-cooled heat condenser 122 to exchanger 118 to subcool liquid $CO_2$ with the cold gas streams in lines 117 and 123. Liquid $CO_2$ discharges from exchanger 118 through line 124 and pressure-reducing valve 125 into separator 126. The pressure reduction of the liquid $CO_2$ passed through valve 125 is controlled so that the liquid knocked down in separator 126 is substantially at the pressure and temperature of the liquid $CO_2$ in tank 89 and therefore can return through line 127 into tank 89. Cold $CO_2$ gas discharged from separator 126 via line 123 helps to subcool liquid $CO_2$ from line 121 passing through condenser 118. $CO_2$ gas of line 123, after flowing through exchanger 118, returns via line 128 to line 87 of FIG. 1 for reliquefaction in condenser 75. Occasionally, depending on the capacity of individual pieces of apparatus and the flow rate of $CO_2$ gas in line 128, some or all of the $CO_2$ gas might be returned via line 129 to compressor 119 for reliquefaction in condenser 118.

The return of $CO_2$ gas from separator 126 via line 128 to line 87 of FIG. 1 or to the portion of line 87 in FIG. 2 on the discharge end of reboiler 90 for reliquefaction in condenser 75 shows that even the additional equipment of FIG. 3 is integrated into the cogeneration system to achieve savings in power consumption and capital investment. Of course, the electrical power required by pump 112 and motor 120 to operate compressor 119 is easily supplied by the output of generators 16 and 26. In fact, the consumption of electricity in FIG. 3 is a very small percentage of that produced by generators 16 and 26. In the example of FIG. 1, if the added equipment of FIG. 3 is designed to deliver 500 tons of refrigeration to the brine passed through coil 114, a total of about 0.80 MW of electric power will be consumed by pump 112 and motor 120; this is less than 1.5% of the combined output of generators 16 and 26. With this electric power consumption, the pressure or $CO_2$ gas is raised by compressor 119 to 900 psia. When the subcooled liquid $CO_2$ is isenthalpically flashed through valve 125 to substantially the pressure of 255 psia in tank 89, approximately 75% is returned as liquid by line 127 to tank 89 and 25% is conveyed as gas by lines 123, 128 to condenser 75 of FIG. 1 or FIG. 2. In short, the example of FIG. 3 shows that refrigeration can be sold profitably by integrating the equipment of FIG. 3 with the basic cogeneration system of FIG. 1 or with that basic system modified as shown by FIG. 2.

The term amine used herein is a shortened word for a class of chemical absorbents known as alkanolamines. The two amines which have proved to be of principal commercial interest are monoethanolamine and diethanolamine. While the specific example of the invention is based on monoethanolamine, other amines are available for use in the invention. A fairly broad discussion, entitled Alkanolamines for Hydrogen Sulfide and Carbon Dioxide Removal, by Kohl and Riesenfeld in their textbook Gas Purification (pages 29–109, 4th Edition, 1985, Gulf Publishing Company), presents the technology of separating $CO_2$ from gases and is made a part of this disclosure.

Variations and modifications of the invention will be apparent to those skilled in the art without departing from the spirit and scope of the invention. For example, if available natural gas or other fuel gas is below the pressure desired for operation of gas turbine 10, a booster-compressor may be added in line 11 to bring the gas up to the desired pressure. Again, the electric power to operate the booster can easily be supplied by the cogeneration system without significantly reducing the amount of net saleable electricity. If the fuel gas in line 11 contains sulfur compounds such as hydrogen sulfide, a unit that absorbs or adsorbs sulfur compounds should be inserted in line 11 not only to protect gas turbine 10 and other equipment, but also to eliminate sulfur compounds as impurities of the liquid $CO_2$ product. As known, reboilers and reflux condensers can be built into columns in lieu of separate elements of apparatus. Steam turbine 24 shown as having a steam outlet at an intermediate-pressure stage can be replaced by two steam turbines connected in tandem; in such case, the steam of line 30 required as process heat is drawn from the steam line connecting the two turbines, each of which drives an electric generator. Language in the appended claims such as: an intermediate-pressure stage of said steam turbine, is intended to include two steam turbines in tandem. Also, $CO_2$ gas in line 123 of FIG. 3 can be condensed with refrigeration from ammonia absorption refrigeration unit 66 in a separate heat exchanger instead of in condenser 75 of FIG. 1 or FIG. 2. Accordingly, only such limitations should be imposed on the invention as are set forth in the appended claims.

What is claimed is:

1. A cogeneration system for the production of electricity and liquid carbon dioxide by the combustion of methane-rich fuel gas, which comprises four integrated components:
    (1) a gas turbine for the combustion of said fuel gas with excess air at elevated pressure, an electric generator driven by said gas turbine, a high-pressure steam boiler connected to receive and burn the exhaust gases from said gas turbine and an additional quantity of said fuel gas, a steam turbine connected to receive high-pressure steam from said steam boiler, and an additional electric generator driven by said steam turbine;
    (2) an amine absorption system for the separation of carbon dioxide from the flue gas produced in said steam boiler of component (1), said absption system having a stripping column with a reboiler connected to be heated with steam from an intermediate-pressure stage of said steam turbine of component (1);
    (3) an ammonia absorption refrigeration unit connected to receive steam from said intermediate-pressure stage of said steam turbine of component (1); and
    (4) apparatus to liquefy carbon dioxide released by said stripping column of component (2), which comprises a compressor, cooling and drying means, and a carbon dioxide condenser, all connected in series, and said condenser connected to receive refrigeration from said ammonia absorption refrigeration unit of component (3).

2. The cogeneration system of claim 1 wherein a fractionation column is connected to receive liquid carbon dioxide from the carbon dioxide condenser of component (4), the reboiler of said fractionation column is connected for the passage therethrough of carbon dioxide from the drying means of component (4), and the reflux condenser of said fractionation column is connected to receive refrigeration from the ammonia absorption refrigeration unit of component (3).

3. The cogeneration system of claim 2 wherein a pipe is connected to convey discard gas from the fractionation column to a heat exchanger disposed in the connection between the cooling means and the drying means of component (4).

4. The cogeneration system of claim 1 wherein a storage tank is connected to receive liquid carbon dioxide formed in the carbon dioxide condenser of component (4), a pump is connected to force liquid carbon dioxide from said tank to a refrigeration exchanger in which said liquid carbon dioxide is vaporized to refrigerate a fluid passed therethrough, a heat exchanger is connected to pass carbon dioxide gas from said refrigeration exchanger to a compressor and thence to a carbon dioxide condenser, said condenser is connected for the flow of liquid carbon dioxide therefrom through said heat exchanger to a pressure-reducing valve that discharges into a gas-liquid separator, and said separator is connected to return liquid to said tank and to send gas to the carbon dioxide condenser of component (4).

5. The cogeneration system of claim 2 wherein a storage tank is connected to receive purified liquid carbon dioxide from the fractionation column, a pump is connected to force liquid carbon dioxide from said tank to a refrigeration exchanger in which said liquid carbon dioxide is vaporized to refrigerate a fluid passed therethrough, a heat exchanger is conneted to pass carbon dioxide gas from said refrigeration exchanger to a compressor and thence to a water-cooled carbon dioxide condenser, said condenser is connected for the flow of liquid carbon dioxide therefrom through said heat exchanger to a pressure-reducing valve that discharges into a gas-liquid separator, and said separator is connected to return liquid to said tank and to send gas to the carbon dioxide condenser of component (4).

6. A cogeneration system for the combustion of methane-rich fuel gas to produce electricity and liquid carbon dioxide, which comprises:
    a gas turbine driven by the combustion of said fuel gas and excess air at elevated pressure,
    an electric generator driven by said gas turbine,
    a high-pressure steam boiler in which the exhaust gases from said gas turbine and an additional quantity of said fuel gas are burned to eliminate substantially all of the excess oxygen in said exhaust gases,
    a steam turbine driven by high-pressure steam from said boiler,
    a second generator driven by said steam turbine, a blower to force flue gas from said boiler through an amine absorption column to scrub carbon dioxide from said flue gas, a stripping column connected to said amine absorption column to strip absorbed carbon dioxide from amine solution flowing from said amine absorption column to said stripping column, a reboiler to heat said amine solution in said stripping column, a steam pipe connected to an intermediate stage of said steam turbine for the flow of steam to said reboiler, said steam pipe being also connected for the flow of steam to an ammonia absorption refrigeration unit, a steam condensate pipe connected to said ammonia refrigeration unit for the flow of steam condensate therefrom to said boiler, said steam condensate pipe being also connected for the flow of steam condensate from said reboiler to said boiler, a water-cooler steam condenser connected to draw completely expanded steam from said steam turbine and to return steam condensate to said boiler, a carbon dioxide compressor connected to draw carbon dioxide from said stripping column and force said carbon dioxide through cooling and drying means, and a carbon dioxide condenser connected to receive dry carbon dioxide from said drying means for the delivery of liquid carbon dioxide, said ammonia refrigeration unit being connected to supply refrigeration to said carbon dioxide condenser.

7. The cogeneration system of claim 6 wherein the carbon dioxide condenser is connected to deliver liquid carbon dioxide to a fractionator having a roboiler and a reflux condenser, the connection for the flow of carbon dioxide from the drying means is directed first to said fractionator reboiler and thence to said carbon dioxide condenser, and the ammonia refrigeration unit is connected to supply refrigeration to said fractionator reflux condenser.

8. The cogeneration system of claim 7 wherein a pipe is connected to pass discard gas from the fractionator to a heat exchanger before said discard gas is vented, and said heat exchangeris connected to cool carbon dioxide before its passage through the drying means.

9. The cogeneration system of claims 6 wherein a turbo-compressor is driven by the gas turbine to raise ambient air to the elevated combustion pressure of said gas turbine.

10. The cogeneration system of claim 6 wherein a storage tank is connected to receive liquid carbon dioxide formed in the carbon dioxide condenser, a pump is connected to force said liquid carbon dioxide from said tank through a refrigeration recovery exchanger, an additional heat exchanger, a gas compressor, a gas cooler, again said additional heat exchanger, and a pressure-reducing valve into a vapor-liquid separator connected for the flow of liquid therefrom back to said tank and for the flow of vapor therefrom to said carbon dioxide condenser.

11. A cogeneration process yielding electricity and liquid carbon dioxide by the combustion of methane-rich fuel gas, which comprises:

combusting said fuel gas with excess air for the performance of work by a gas turbine, thereby forming combustion products containing residual oxygen, utilizing said performance of work to drive an electric generator to yield electricity, combusting an additional quantity of said fuel gas with said combustion products to produce high-pressure steam and a flue gas containing at most a fractional percentage of residual oxygen, said additional quantity of said fuel gas being controller to be substantially just enough to consume said residual oxygen in said combustion products, passing said high-pressure steam through a steam turbine thereby performing additional work, utilizing said additional work to drive an additional electric generator to yield additional electricity, scrubbing said flue gas with amine solution to absorb carbon dioxide therefrom, stripping absorbed carbon dioxide from said amine solution by heating with steam drawn from an intermediate stage of said steam turbine, compressing and drying the stripped carbon dioxide, applying refrigeration to the compressed, dry carbon dioxide to yield liquid carbon dioxide, and producing said refrigeration with an ammonia absorption refrigeration unit wherein the required heat for the operation of said unit is supplied by steam drawn from said intermediate stage of said steam turbine.

12. The cogeneration process of claim 11 wherein the liquid carbon dioxide is fractionated to yield purified liquid carbon dioxide by passage of the compressed, dry carbon dioxide in heat exchange ralation with liquid in the fractionation zone to provide reboiler haat to said liquid prior to the application of refrigeration to said compressed, dry carbon dioxide to yield said liquid carbon dioxide, by introducing said liquid carbon dioxide into said fractionation zone, and by applying refrigeration from the ammonia absorption refrigeration unit to vapor at the top of said fractionation zone to provide reflux liquid therefor.

13. The cogeneration process of claim 12 wherein discard gas from the fractionation zone is passed in heat exchange relation with the compressed carbon dioxide prior to drying said compressed carbon dioxide.

14. The cogeneration process of claim 12 wherein the purified liquid carbon dioxide is accumulated in a storage zone, a stream of said purified liquid carbon dioxide drawn from said storage zone is vaporized by heat exchange with a fluid requiring refrigeration, the resulting vapor stream is passed in countercurrent heat exchange relation with liquid carbon dioxide obtained by compressing and condensing said vapor stream, thereafter said liquid carbon dioxide is expanded isenthalpically to yield in part liquid which is returned to said storage zone and in part residual vapor which is passed in countercurrent heat exchange relation with said liquid carbon dioxide prior to said expansion thereof, and thereafter refrigeration from the ammonia absorption refrigeration unit is applied to said residual vapor to yield again liquid carbon dioxide.

15. A cogeneration process for the production of electricity and liquid carbon dioxide, which comprises:

burning pressurized methane-rich fuel gas and excess air in a gas turbine to drive an electric generator thereby producing electricity and combustion products containing residual oxygen, burning said combustion products and an additional quantity of said fuel gas to yield a flue gas substantially free of said residual oxygen while generating high-pressure steam, feeding said high-pressure steam to a steam turbine to drive an additional electric generator thereby producing additional electricity, absorbing carbon dioxide of said flue gas in amine solution, stripping absorbed carbon dioxide from said amine solution by heating said amine solution with steam drawn from an intermediate pressure stage of said steam turbine, compressing, cooling and drying the stripped carbon dioxide, generating refrigeration in an ammonia absorption refrigeration unit by supplying the required heat with steam drawn from said intermediate pressure stage of said steam turbine, and applying said refrigeration to the compressed, cooled and dry carbon dioxide to produce liquid carbon dioxide.

16. The cogeneration process of claim 15 wherein the liquid carbon dioxide is purified by fractionation comprising passing the compressed, cooled and dry carbon dioxide in heat exchange relation with liquid carbon dioxide at the bottom of the fractionation zone before the refrigeration is applied to said dry carbon dioxide, and applying some of said refrigeration to vapor at the top of said fractionation zone to provide reflux therefor.

17. The cogeneration process of claim 16 wherein purified liquid carbon dioxide issuing from the fractionation zone discharges into a liquid storage zone, liquid therefrom is vaporized by heat exchange with a fluid requiring refrigeration, the resulting vapor is passed in countercurrent heat exchange relation with liquid formed by compression and condensation of said vapor, and the resulting liquid is isenthalpically expanded to yield liquid which is returned to said storage zone and vapor to which refrigeration from the ammonia absorption refrigeration unit is applied to form again liquid carbon dioxide.

18. The cogeneration process of claim 15 wherein the amine solution contains monoethanolamine or diethanolamine.

* * * * *

UNITED STATES PATENT AND TRADEMARK OFFICE
CERTIFICATE OF CORRECTION

PATENT NO. : 4,942,734
DATED : July 24, 1990
INVENTOR(S) : Markbreiter et al

It is certified that error appears in the above-identified patent and that said Letters Patent is hereby corrected as shown below:

Column 1, line 27, "expansion or" should be --expansion of--.
Column 3, line 52, before "40" insert --line--.
Column 4, line 13, "exist" should be --exits--; line 19, "complete" should be --completes--; line 62, after "flows" insert --via--.
Column 6, line 24, "heat" should be deleted; line 60, "or $CO_2$" should be --of $CO_2$--.
Column 7, line 14, before "gases" insert --other--; line 64, "absoption" should be --absorption--.
Column 9, line 12, "rebolier" should be --reboiler--; line 20, "water-cooler" should be --water-cooled--; line 35, "roboiler" should be --reboiler--;

Column 10, line 7, "controller" should be --controlled--; line 22, "absop-" should be --absorp---; line 30, "ralation" should be --relation--; line 31, "haat" should be --heat--.

Signed and Sealed this

Third Day of December, 1991

Attest:

HARRY F. MANBECK, JR.

Attesting Officer     Commissioner of Patents and Trademarks